E. S. WILLIAMSON.
OVERSHOE FOR HORSES.
APPLICATION FILED JULY 3, 1915.
1,156,571.
Patented Oct. 12, 1915.
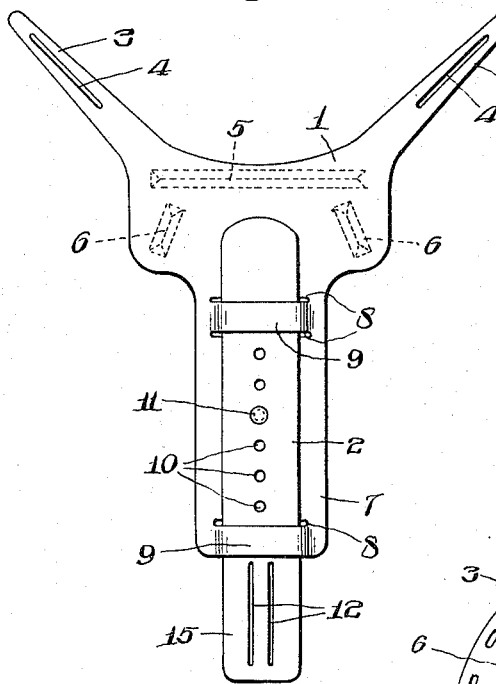
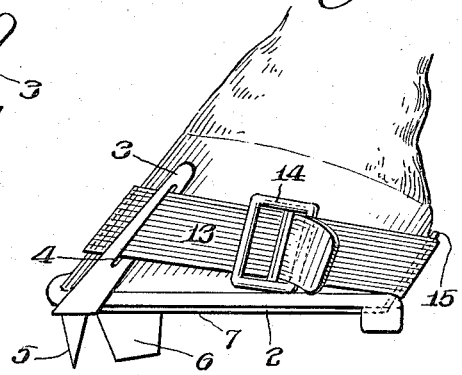
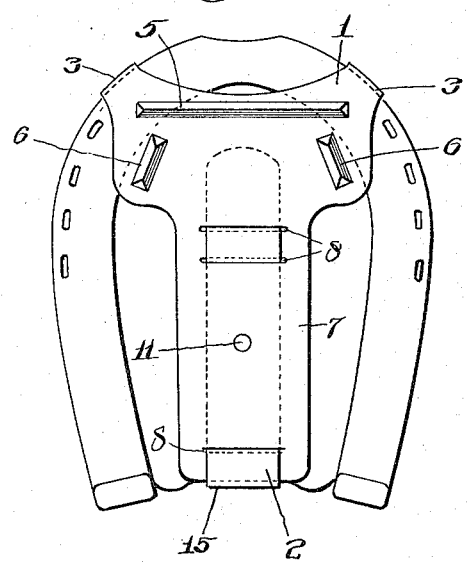
WITNESSES:
INVENTOR
Elias S. Williamson
BY
Chas. A. Cutter.
ATTORNEY.

UNITED STATES PATENT OFFICE.

ELIAS S. WILLIAMSON, OF PHILADELPHIA, PENNSYLVANIA.

OVERSHOE FOR HORSES.

1,156,571.      Specification of Letters Patent.      Patented Oct. 12, 1915.

Application filed July 3, 1915. Serial No. 37,816.

*To all whom it may concern:*

Be it known that I, ELIAS S. WILLIAMSON, a citizen of the United States, and a resident of the city and county of Philadelphia, State of Pennsylvania, have invented certain new and useful Improvements in Overshoes for Horses, of which the following is a specification.

My invention relates to improvements in overshoes for horses, and the object of my invention is to furnish a shoe which can be instantly attached to a horse's hoof, over the usual shoe nailed thereto, whenever there is sufficient snow or ice upon the ground to require a specially sharp shoe to prevent slipping.

My overshoe consists of two metal parts the front one of which is furnished with extensions or toe pieces which are bent up to engage the sides of the hoof and the rear one of which is slidingly carried by the front part, is bent up at the rear to engage the rear end of the hoof and which is secured to the front part by suitable means, a screw for instance. The portions of the overshoe which engage the front and rear sides of the hoof are slotted or furnished with keepers for a strap which is buckled around the hoof to keep the overshoe in place. The underside of the overshoe is furnished with suitable calks to engage and cut into the slippery surface to prevent slipping.

My invention is illustrated in the accompanying drawings in which similar numerals of reference indicate similar parts throughout the several views, and in which—

Figure 1, is a bottom plan of the blanks or forgings from which the metal part of the overshoe is made, the parts which engage the sides and rear of the hoof being unbent and the two metal parts of the overshoe being engaged one with the other. Fig. 2, a side elevation of a horse's hoof to which my improved overshoe is attached. Fig. 3, a bottom view of Fig. 2.

The metal part of my overshoe, as before stated, is made in two pieces 1—2 which may be forged or made from malleable iron. The front piece 1 is furnished with extensions or toe pieces 3, which are slotted at 4, or otherwise furnished with keepers for a strap, which are adapted to be bent up to engage the sides of the hoof as shown in Fig. 2. The piece 1 is further furnished with suitable calks 5—6, the former extending transversely across the front piece 1 and the latter disposed to the rear of calk 5 and preferably placed as shown in Fig. 1.

7 is a rearwardly extending part of the piece 1 which slidingly carries the piece 2, the piece 1 being transversely cut on the lines 8 and bent so as to form keepers 9 for carrying piece 2. The piece 2 is furnished with tapped holes 10 for a screw 11 which passes through part 1 and into one of the holes 10. At its rear end the part 2 is furnished with slots 12, to pass the buckled strap which secures the overshoe to the hoof as shown in Fig. 2, and this end of the part 2 is adapted to be bent up to engage the rear side of the hoof as shown in Fig. 2.

13 is a strap, furnished with a buckle 14 which is adapted to hold the overshoe to the hoof.

It will be observed that my overshoe can be used upon hoofs of any size, if they be large the screw 11 is loosened and the part 2 drawn back until the bent up rear portion 15 of the part 2 will properly engage the rear side of the hoof when the screw 11 is replaced entering the hole 10 in the part 2 that is suitable for this adjustment. If the hoof be small the part 2 is moved in until the overshoe will fit the smaller hoof.

Having thus described my invention I claim as new and desire to secure by Letters Patent:—

1. An overshoe for horses comprising, in combination, two metal parts the front one of which is provided with calks and with extensions adapted to engage the sides of the hoof and the rear one of which is adjustably carried by the front one and furnished with an extension adapted to engage the rear side of the hoof, a means for locking one plate to the other, and a strap carried by said extensions for fastening said overshoe to the hoof.

2. In an overshoe for horses, in combination, a metal part the forward end of which is provided with extensions adapted to be bent up to engage the sides of the hoof, the under side of which is provided with calks, and which is furnished with a rearwardly extending part cut and bent to form keepers, a second metal part slidingly carried by the keepers of the first part and the rear end of which is furnished with an extension for engaging the rear side of the hoof, a means for securing the two said parts together, and a strap for securing said extensions to the hoof.

3. In an overshoe for horses, in combination, a metal part the forward end of which is provided with slotted extensions adapted to be bent up to engage the sides of the hoof and the under part of which is provided with calks, and which is furnished with a rearwardly extending part cut and bent to form keepers, a second metal part carried by the keepers of the first part and furnished with a slotted extension at its rear end adapted to be bent up to engage the rear side of the hoof, means for securing the two said parts together, a strap passing through the slots in said extension for securing them to the hoof, and a buckle upon said strap.

ELIAS S. WILLIAMSON.

Witnesses:
JAMES DE FRATES,
SAMUEL HEAN.

Copies of this patent may be obtained for five cents each, by addressing the "Commissioner of Patents, Washington, D. C."